United States Patent

Yoo

(10) Patent No.: US 6,698,718 B2
(45) Date of Patent: Mar. 2, 2004

(54) ROTARY VALVE

(75) Inventor: Woo Sik Yoo, Palo Alto, CA (US)

(73) Assignee: WaferMasters, Inc., San Jose, CA (US)

( * ) Notice: Subject to any disclaimer, the term of this patent is extended or adjusted under 35 U.S.C. 154(b) by 251 days.

(21) Appl. No.: 09/943,240

(22) Filed: Aug. 29, 2001

(65) Prior Publication Data

US 2003/0042457 A1 Mar. 6, 2003

(51) Int. Cl.⁷ ................................................ F16K 5/00
(52) U.S. Cl. .......................................... 251/309; 251/181
(58) Field of Search ........................ 251/309, 368, 251/181; 137/343, 375, 625.33

(56) References Cited

U.S. PATENT DOCUMENTS

| | | |
|---|---|---|
| 477,608 A | 6/1892 | Pratt |
| 2,891,763 A | 6/1959 | Fortune et al. ............ 251/333 |
| 3,834,595 A * | 9/1974 | Brock et al. ................ 222/504 |
| 3,973,753 A * | 8/1976 | Wheeler ...................... 251/204 |
| 3,991,975 A * | 11/1976 | Sibrava ....................... 251/317 |
| 4,244,557 A | 1/1981 | Polhede et al. ............. 251/167 |
| 4,328,947 A | 5/1982 | Reimpell et al. ............. 251/80 |
| 4,446,815 A | 5/1984 | Kalbskopf et al. .......... 118/718 |
| 4,613,111 A | 9/1986 | Paquet et al. ................. 251/46 |
| 4,721,282 A | 1/1988 | Shawver et al. .............. 251/62 |
| 4,921,213 A | 5/1990 | Geiser ......................... 251/328 |
| 5,013,009 A | 5/1991 | Nelson ........................ 251/357 |
| 5,226,632 A | 7/1993 | Tepman et al. .......... 251/335.3 |
| 5,271,602 A | 12/1993 | Funaba .................... 251/335.3 |
| 5,363,872 A | 11/1994 | Lorimer ......................... 137/1 |
| 5,641,149 A | 6/1997 | Ito .............................. 251/158 |
| 5,667,197 A | 9/1997 | Boyd et al. ................. 251/193 |
| 5,820,104 A | 10/1998 | Koyano et al. ............. 251/326 |
| 5,915,410 A | 6/1999 | Zajac .......................... 137/341 |
| 5,999,842 A * | 12/1999 | Harrison et al. ............ 600/474 |
| 6,116,572 A | 9/2000 | Schlattmann et al. ....... 251/193 |

FOREIGN PATENT DOCUMENTS

| | | | |
|---|---|---|---|
| EP | 0 665 193 | 8/1995 | ............ C03C/17/00 |

\* cited by examiner

*Primary Examiner*—Edward K. Look
*Assistant Examiner*—John K. Fristoe, Jr.
(74) *Attorney, Agent, or Firm*—MacPherson Kwok Chen & Heid LLP (57) ABSTRACT

A valve assembly including a main body defining a central axis and a gate. The gate includes a curved surface relative to the central axis and the gate is disposed within the main body. The gate is rotatable about an axis of rotation running along the length of the gate. The valve assembly also includes an actuation assembly for rotating the gate about the axis of rotation between a first position where said valve is open and a second position where said valve is closed.

18 Claims, 13 Drawing Sheets

ROTARY VALVE

BACKGROUND OF THE INVENTION

1. Field of the Invention

This invention generally relates to semiconductor manufacturing equipment and, more particularly, to a gate valve for use with a rapid thermal processing reactor.

2. Description of Related Art

In the semiconductor industry, to continue to make advancements in the development of semiconductor devices, especially semiconductor devices of decreased dimensions, new processing and manufacturing techniques have been developed. One such processing technique is known as Rapid Thermal Processing (RTP), which reduces the amount of time that a semiconductor device is exposed to high temperatures during processing. The RTP technique typically includes irradiating the semiconductor device or wafer with sufficient power to quickly raise the temperature of the wafer and hold it at that temperature for a time long enough to successfully perform a fabrication process, while avoiding such problems as unwanted dopant diffusion that would otherwise occur at the high processing temperatures.

As is widely known in the semiconductor processing industry, processing techniques such as RTP require fabrication clean room space to ensure that the processing is free from contaminants and particles that may reduce manufacturing precision. However, clean room space is expensive both to construct and maintain. Thus, semiconductor wafer processing systems which require large footprints are economically disadvantageous. Accordingly, processing system designers have attempted to construct systems having components with smaller, more compact, and narrower structures.

Gate valve structures may be used in the processing system to isolate semiconductor wafers in various chambers, as the wafers are transported between locations of a first pressure to areas of a second pressure. Although, the concept of isolating or sealing a chamber using gate valves is straightforward, the design of such valves can be complicated, especially due to competing design considerations. For example, the gate valve must provide adequate positive closure that can withstand process pressure and vacuum. Most often this need has been met using complicated linkages that typically require both an axial and a lateral sealing action. For example, an apparatus is disclosed in U.S. Pat. No. 4,721,282 where an initial axial motion of a shaft provides for the primary movement of a gate member toward a processing chamber port. A secondary lateral motion provides for movement of the gate member against the port for a positive seal.

To conserve clean-room space and provide access to a process chamber, what is needed is a gate valve, which occupies a relatively small volume to maintain a small processor footprint and provides adequate isolation to the process chamber of a processing system during semiconductor processing.

SUMMARY OF THE INVENTION

In accordance with the invention, a valve assembly includes a main body defining a central axis and a gate. The gate includes a curved surface relative to the central axis and the gate is disposed within the main body. The gate is rotatable about an axis of rotation running along the length of the gate. The valve assembly also includes an actuation assembly for rotating the gate about the axis of rotation between a first position where said valve is open and a second position where said valve is closed.

This invention will be more fully understood in light of the following detailed description taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

A method and apparatus are disclosed for determining robot alignment of semiconductor wafers and wafer-like objects contained in a carrier or container. The invention may be used in a variety of applications including the manufacture of semiconductor devices, hard disks, and liquid crystal displays.

Figure 1A:
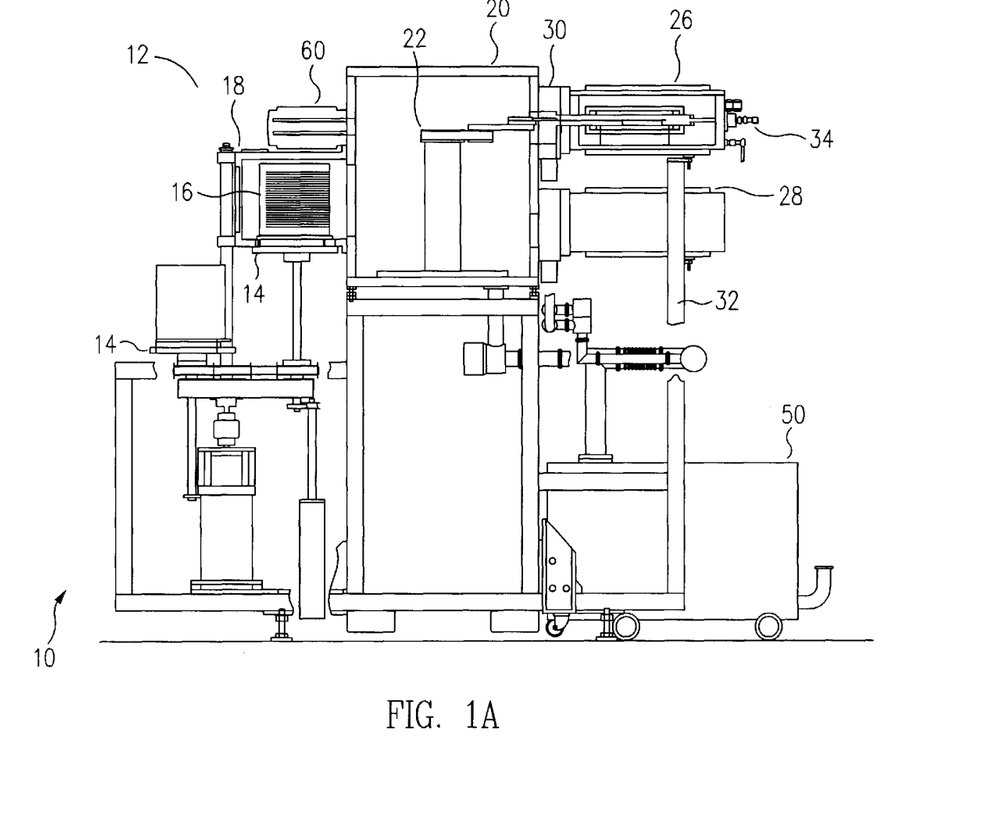
FIGS. 1A and 1B are schematic illustrations of a side view and top view, respectively, of one embodiment of a semiconductor wafer processing system that is suitable for use with the described rotary valve.
Figure 1B:
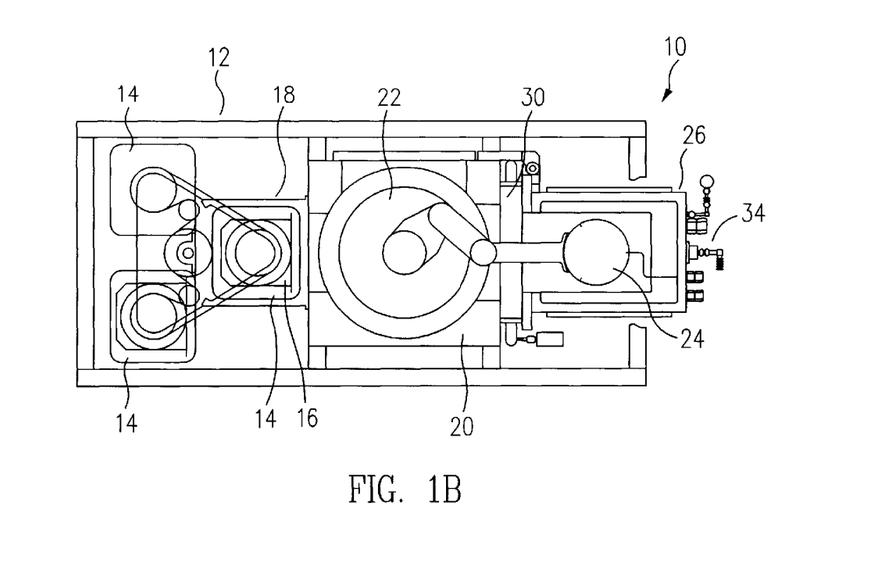

FIGS. 1A and 1B are schematic illustrations of a side view and top view, respectively, of one embodiment of a semiconductor wafer processing system 10 that establishes a representative environment of the present invention. The representative system is fully disclosed in co-pending U.S. patent application Ser. No. 09/451,677 now U.S. Pat. No. 6,410,455, which is herein incorporated by reference for all purposes. Processing system 10 includes a loading station 12 which has multiple platforms 14 for supporting and moving a wafer cassette 16 up and into a loadlock 18. Wafer cassette 16 may be a removable cassette which is loaded into a platform 14, either manually or with automated guided vehicles (AGV). Wafer cassette 16 may also be a fixed cassette, in which case wafers are loaded onto cassette 16 using conventional atmospheric robots or loaders (not shown). Once wafer cassette 16 is inside loadlock 18, loadlock 18 and transfer chamber 20 are maintained at atmospheric pressure or else are pumped down to a vacuum pressure using a pump 50. A robot 22 within transfer chamber 20 rotates toward loadlock 18 and picks up a wafer 24 from cassette 16. A reactor or thermal processing chamber 26, which may also be at atmospheric pressure or under vacuum pressure, accepts wafer 24 from robot 22 through a gate valve 30. Optionally, additional reactors may be added to the system, for example reactor 28. Robot 22 then refracts and, subsequently, gate valve 30 closes to begin the processing of wafer 24. After wafer 24 is processed, gate valve 30 opens to allow robot 22 to pick-up and place wafer 24 into cooling station 60. Cooling station 60 cools the newly processed wafers before they are placed back into a wafer cassette in loadlock 18. In accordance with an embodiment of the present invention, reactors 26 and 28 are RTP reactors, such as those used in thermal anneals. In other embodiments, reactors 26 and 28 may also be other types of reactors, such as those used for dopant diffusion, thermal oxidation, nitridation, chemical vapor deposition, and similar processes. Reactors 26 and 28 are generally horizontally displaced though they may be vertically displaced (i.e. stacked one over another) to minimize floor space occupied by system 10. Reactors 26 and 28 are bolted onto transfer chamber 20 and are further supported by a support frame 32. Process gases, coolant, and electrical connections may be provided through the rear end of the reactors using interfaces 34.

Figure 2:
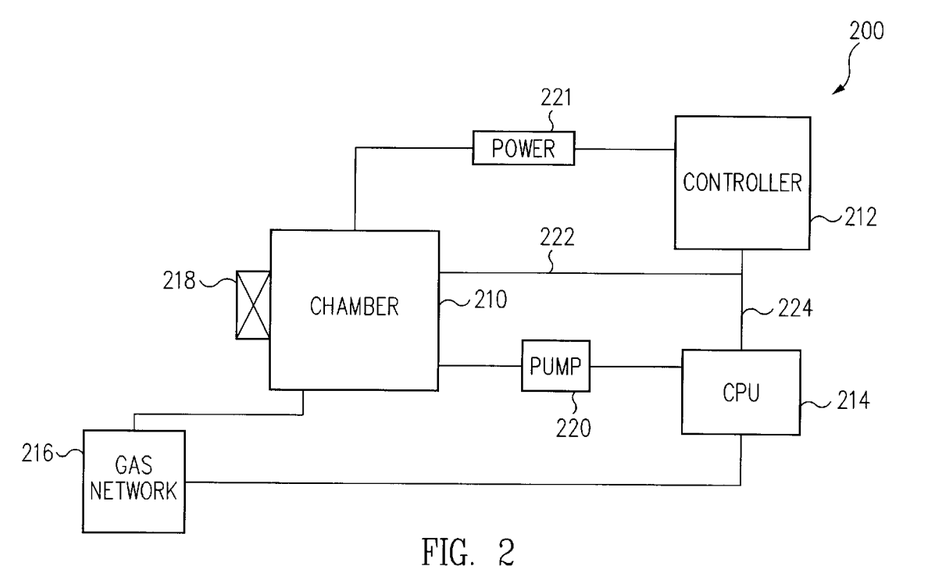
FIG. 2 is a block diagram of an embodiment of an RTP reactor system in the semiconductor wafer processing system.

A simplified block diagram of an RTP reactor system is shown in FIG. 2. In one example, reactor system 200 may include a reactor chamber 210, a controller 212, a process control computer 214, a gas network 216, a rotary gate valve assembly 218, and a pump assembly 220. A microprocessor or process control computer 214, generally controls the processing of a semiconductor wafer placed in the RTP reactor and may be used to monitor the status of the system for diagnostic purposes. In one embodiment, process computer 214 provides control signals to controller 212 in response to temperature data received from temperature sensors (not shown) in chamber 210. Process computer 214 may also direct pressure setpoints to pump assembly 220 as well as gas and plasma inlet flow signals to mass-flow controllers in gas network 216. For example, controller 212 may be a real-time Proportional Integral Derivative (PID), multi-zone controller, available from Omega Corporation. Controller 212 provides control signals to a SCR-based phase controlled power supply 221, which provides power to the resistive heating elements provided in chamber 210. In operation, the multi-zone controller receives temperature sensor outputs via sensing line 222 from chamber 210, as well as the desired wafer temperature setpoint from computer 214 via line 224 and delivers controlled power setpoints to the heating element power supply 221. The heating elements increase or decrease their energy output in response to the increase or decrease in power supplied from power supply 221.

Figure 3:
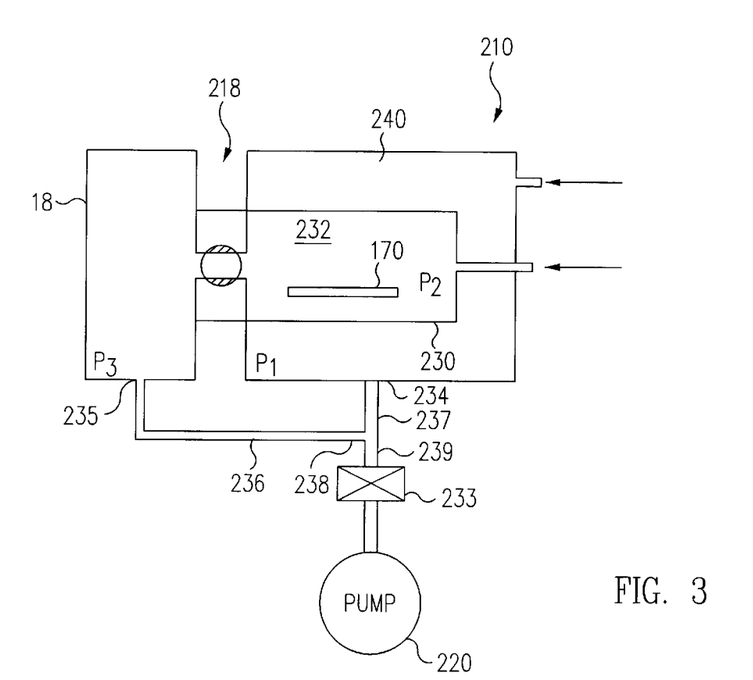
FIG. 3 is a simplified schematic illustration of a reactor chamber.

FIG. 3 shows an alternative embodiment of reactor chamber 210, which may help to maintain the structural integrity of quartz tube 230 during high temperature processing. An external cavity 240 may be formed around tube 230 and filled with air, $N_2$, $O_2$ or other process gases. Using pure gases to fill the external cavity may help to extend the usage life of other components, such as heating elements, which may be housed in cavity 240. External cavity 240 may be maintained having at least an equal or lower pressure than interior cavity 232 ($P1 \leq P2$). In one embodiment, tube 230 may be in communication with loadlock 18, typically through rotary gate valve 218, such that the pressure in tube 230 may be equal to the pressure in loadlock 18 ($P2=P3$). In this embodiment, the pressure differential between external cavity 240 and tube 230 creates a force on the internal walls of tube 230. To create the pressure differential external cavity 240 is evacuated directly at orifice 234 and through pump pipe 237. Tube 230 is evacuated through loadlock 18 at orifice 235 and through loadlock pipe 236. Pump pipe 237 and loadlock pipe 236 meet at tube intersection 238 and proceed as one pipe 239 to pump assembly 220. Since the combined volume of loadlock 18 and tube 230 is greater than the volume of external cavity 240, it follows that the pressure in external cavity 240 can be less than that in the combined loadlock 18 and tube 230 configuration. In this manner, the internal pressure in tube 230 can be used to fortify tube 230 against failure, and ensures that the structural integrity of tube 230 is maintained.

Pump assembly 220 may include any suitable pump for creating the required process pressures within chamber 210. Pump assembly 220 may also serve other purposes. For example, pump assembly 220 may be used to pump down or create a vacuum in process chamber 230, such that the cool down rate within the chamber can be controlled. An exemplary pump assembly may include mechanical pump model HC-60B available from Kashiyama Industries Ltd.

As shown in FIG. 3, the processing chamber section may generally include a closed-end process chamber or tube 230, which defines an interior cavity 232. In one embodiment, tube 230 may be constructed with a substantially rectangular cross-section, having a minimal internal volume surrounding a wafer 170. Wafer 170 may be made of conventional materials commonly used in the industry, such as silicon, gallium arsenide, or other similar compound or the wafer may be a semiconductor wafer, made from quartz or glass. In this embodiment, the volume of tube 230 is usually no greater than 5000 $cm^3$, preferably the volume is less than about 3000 $cm^3$. One result of the small volume is that uniformity in temperature is more easily maintained. Additionally, the small tube volume allows reactor chamber 210 to be made smaller, and as a result, system 10 may be made smaller, requiring less clean room floor space. The smaller reactor size, in conjunction with the use of the robot loader, allows multiple reactors to be used in system 10 by vertically stacking the reactors as shown in FIG. 1A. Tube 230 is made of quartz, but may be made of silicon carbide, $Al_2O_3$, or other suitable material. To conduct a process, quartz tube 230 should be capable of being pressurized. Typically, tube 230 should be able to withstand internal pressures of about 0.001 Torr to 1000 Torr, preferably between about 0.1 Torr and about 760 Torr.

Figure 4A:
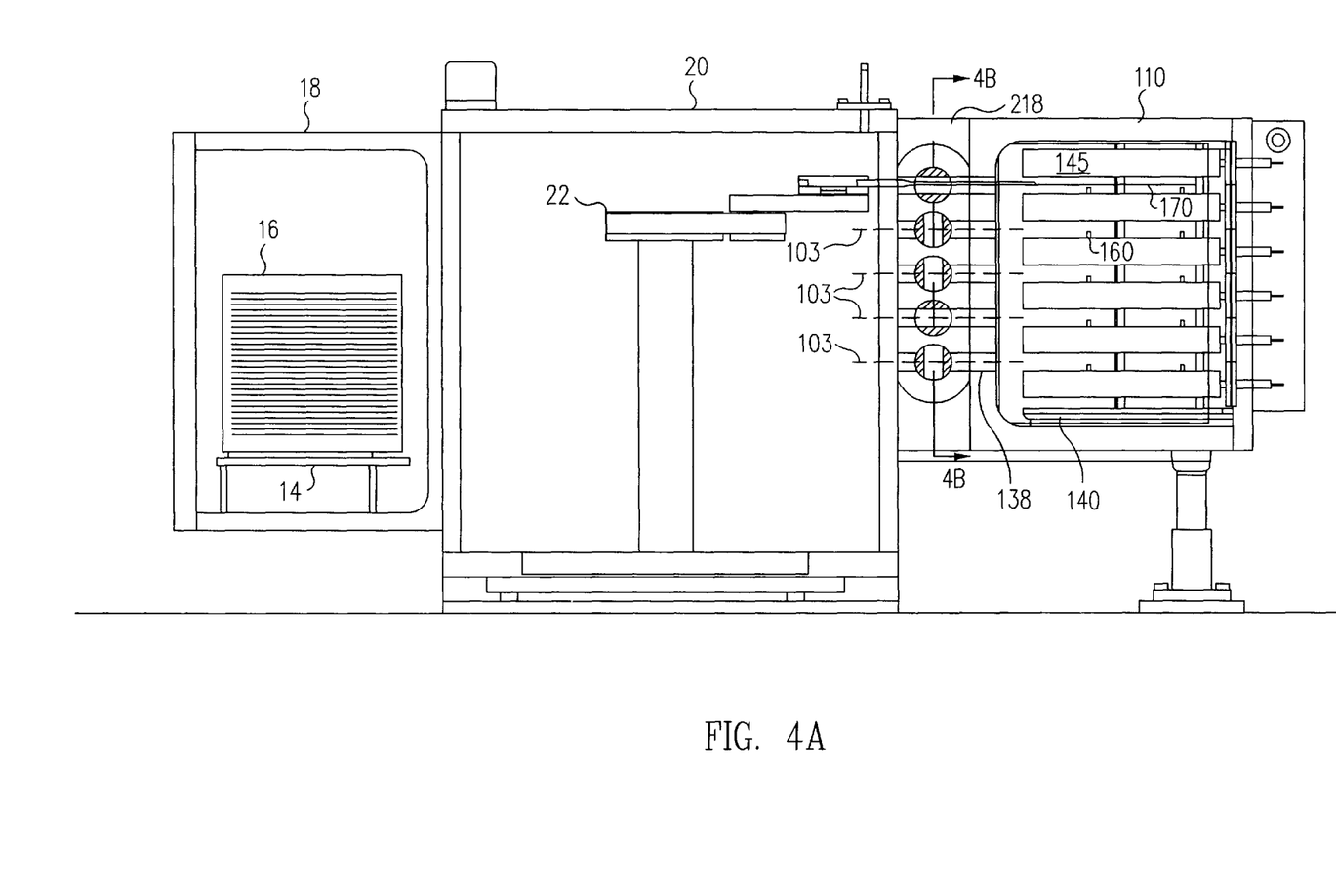
FIGS. 4A–4C illustrate side view and cross-sectional views of a semiconductor wafer processing system incorporating an example of a rotary valve.
Figure 4B:
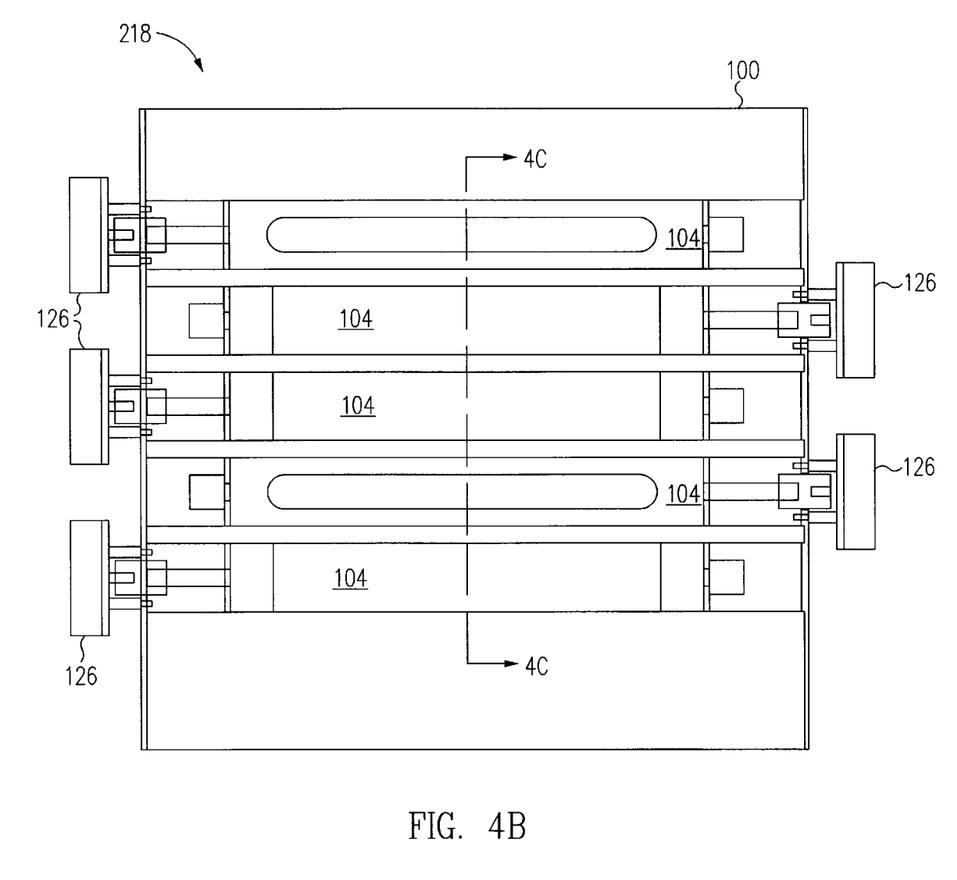
Figure 4C:
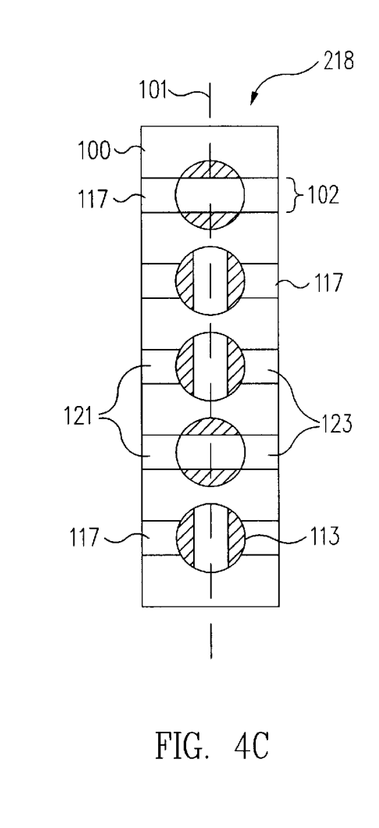

Referring to FIGS. 4A–4C, the loading/unloading section of reactor chamber 110 includes gate valve assembly 218. Chamber 110 also includes a hot plate support 140, a plurality of hot plates 145, and wafer support standoffs 160 located on each hot plate. Hot plate 145 may be used for the heat treatment of semiconductor wafers, as well as the baking or heating of wafers. Housed within gate valve main body 100 and aligned along the valve central axis 101 are a plurality of rotary gates 104, and a rotary actuator 126 for each rotary gate 104, all assembled together to provide gate valve assembly 218. In one example, valve main body 100 defines a plurality of ports 117. Each port 117 has a first end 121, which provides initial access to reactor 110 through gate valve 218, and a second end 123, which has an aperture or opening 102 configured to mate with aperture 138 of quartz tube 230. The geometry and dimensions of valve aperture 102 generally correspond to those of reactor aperture 138, so that valve aperture 102 and reactor aperture 138 can be used together to provide a seal, which maintains a selected vacuum or pressurized environment within tube 230 or isolates cavity 232 during wafer processing operations. Standoffs 160 may be formed from any high temperature resistant material, such as quartz. Standoffs 160 may have a height of between about 50 μm and about 20 mm. In order to monitor the temperature of wafer 170 during processing, at least one thermocouple may be embedded into at least one standoff 160.

Aperture 138 at one end of tube 230 provides access for the loading and unloading of wafer 170 before and after processing. Aperture 138 may be a relatively small opening, but with a height and width large enough to accommodate a wafer of between about 0.5 to 2 mm thick and up to about 300 mm (~12 in.) in diameter, and robot arm 22 passing therethrough. The height of aperture 138 is no greater than between about 18 mm and 50 mm, and preferably, no greater than 20 mm. The relatively small aperture size helps to reduce radiation heat loss from tube 230. Also, the small aperture size reduces the number of particles entering cavity 230 and allows easier maintenance of the isothermal temperature environment. In one embodiment, during a processing procedure, an edge of wafer 170 may be no less than 50 mm from aperture 138 when the wafer is placed on standoffs 160.

As seen in FIGS. 5A–5E, rotary gate 104 is an elongated cylinder mounted along valve main body 100. Rotary gate 104 may be made of quartz, ceramics or any metallic material such as aluminum, stainless steel or $Al_2O_3$. Rotary gate valve 104 may be machined or formed by extrusion. Each rotary gate includes a slot 105 aligned along an axis 103 with aperture 102 and aperture 138 when gate 104 is in an open position. The number of slots 105 is generally equal to the number of ports 117. Slot 105 may be machined into gate 104; sized and shaped so as to allow robot 22 to pass a wafer 170 from transfer chamber 20 through port 117 to chamber 110 where wafer 170 is placed upon wafer support standoffs 160. Slot 105 is roughly oblong-shaped and cut through gate 104 along a cross-sectional diameter of gate 104. Slot 105 may be rectangular or any shape suitable for a wafer 170 to be passed through it by robot 22. The length of slot 105 is less than that of the elongated cylinder which forms gate 104. The elongated cylinder is well suited for sealing slot-type openings, such as valve aperture 102. The geometry of gate 104 may be changed to accommodate differently shaped openings. Preferably, as shown in FIGS. 4A–4C, gate 104 may be circular in cross-section. In one example, outer surface 113 of gate 104 may have a highly polished surface or may be coated with a heat/radiation reflective coating, such as gold, silver, polished aluminum Ni, Molybdenum, or other metal with a high melting point relative to the process temperatures. A SiN coating may be placed on top of the reflective coating, e.g. when the reflective coating is a silver layer, for U.V. protection. The reflective coating may be a thin-film coating (e.g., less than one micron in thickness). The reflective surface may reflect radiation energy, which may leak through valve aperture 102, back into tube 230. Each rotary gate 104 further includes a drive shaft 107 which is connected to the rotary actuator 126 for that rotary gate 104. A rotary valve allows a smaller process chamber to be used. Space savings allow a user to stack additional process chambers.

Figure 5A:
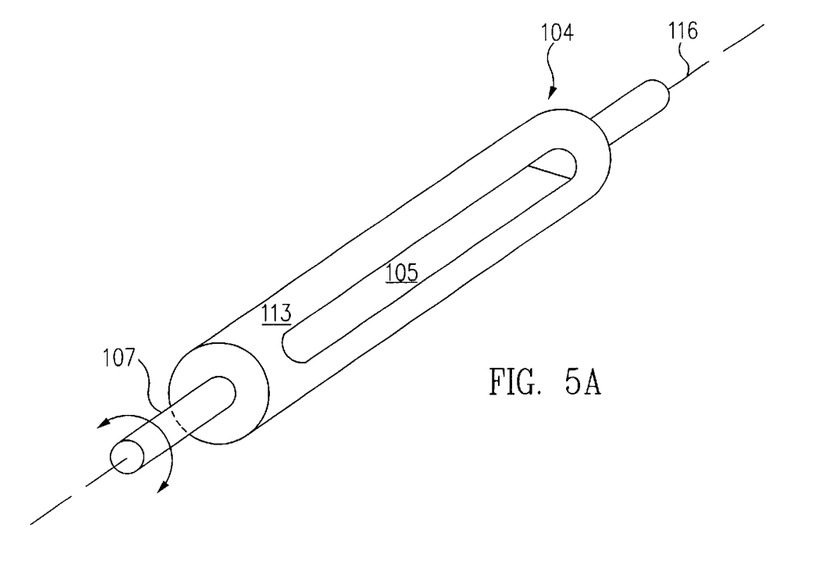
FIGS. 5A–5E illustrate an embodiment of a rotary gate valve in open and closed positions.
Figure 5B:
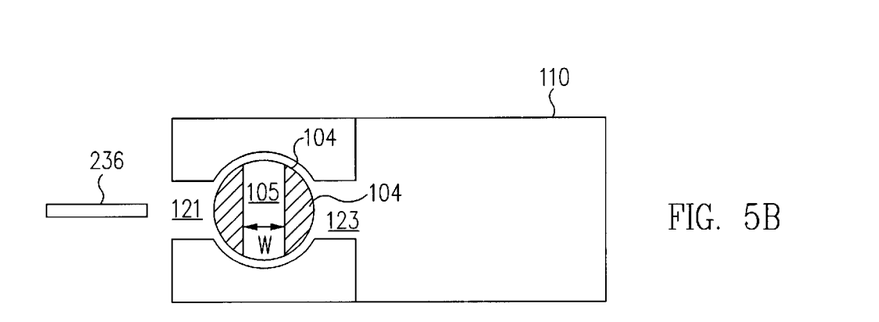
Figure 5C:
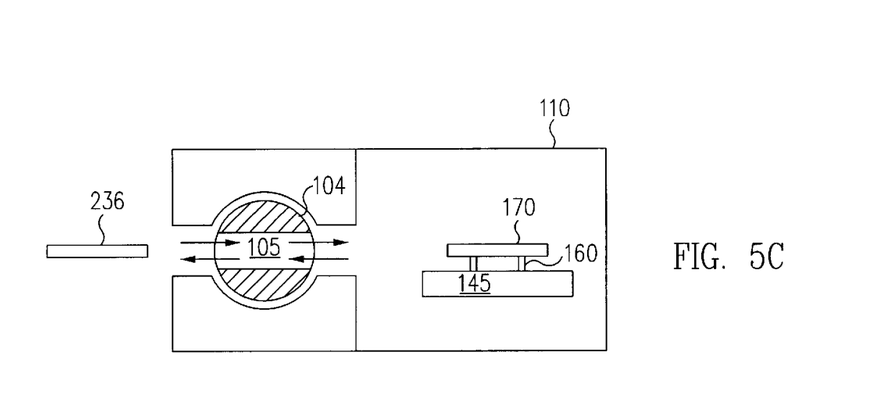

By way of example, rotary actuator 126 rotates rotary gate 104 between a closed position and an open position, as seen in FIGS. 5B and 5C, respectively. The width w of slot 105 is sufficient to allow robot 22 to pass wafer 170 through slot 105 into and out of chamber 110. Rotary valve 104 is in a closed position (FIG. 5B) as wafer 170 is brought to end 121. Rotary actuator 126 is activated and rotates rotary valve 104 along axis of rotation 116. When rotary valve 104 achieves open position (FIG. 5C), slot 105 is now positioned to permit robot 22, which is carrying wafer 170, to pass through ends 121, 123 into chamber 110. Wafer 170 is placed on wafer supports 160 and robot 22 is withdrawn through ends 121, 123.

Rotary actuator 126 is air-driven or electro-magnetically-driven. In one example, to move drive shaft 107, actuator 126 is activated by software implemented by the computer. Actuator 126 opens/closes gate 104 as necessary. Before wafers may be moved into the process chamber, gate 104 is opened by actuator 126. Robot 22 then inserts/transfers the wafers to the process chamber. After insertion of the wafers, robot 22 is retracted to the transport module and actuator 126 moves gate 104 into a closed position. When wafer processing is completed, software instructs actuators 126 to move gate 104 into an open position. Robot 22 enters the process chamber to remove the processed wafers. When the wafers are removed, software again activates to close gate 104.

Figure 5D:
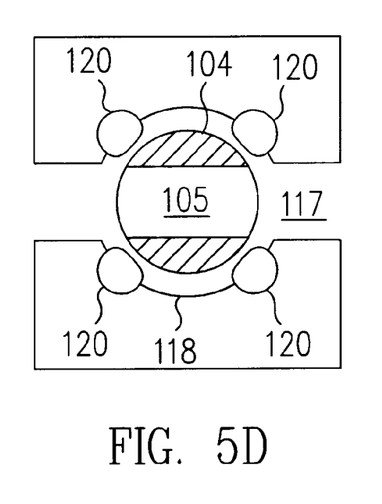
Figure 5E:
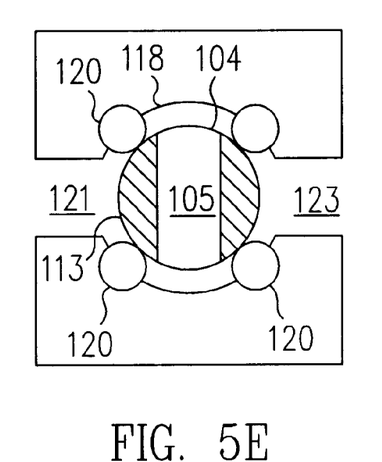

As shown in FIGS. 5D–5E, when rotary valve 104 is closed, port 117 is sealed to prevent contamination of chamber 110 from the outside environment during processing and vice versa. As seen in FIG. 5E, a number of inflatable gaskets 120 may be placed along the surface 118 of port 117. Gaskets 120 extend along the length of rotary valve 104 and are typically longer than the length of slot 105. Gaskets 120 may be made of U.V resistant or high temperature resistant rubber. When rotary valve 104 is rotated to a closed position (FIG. 5E), slot 105 is no longer aligned with ends 121, 123. Gaskets 120 inflate and press against surface 113 of rotary valve 104, sealing the respective spaces between ends 121, 123 and slot 105. Each gasket 120 on surface 118 contacts surface 113 of rotary valve 104 with a force F to create a positive seal, which isolates process chamber 110. Gaskets 120 can be pressurized by a pump or compressed air. Pressurized air comes from a tank or compressor which is part of the entire assembly or separate. In order to deflate gaskets 120, either a pump may be used to remove the gas or air within each gasket 120 or a valve may be opened for air to bleed out of each gasket 120. In the alternative, gaskets 120 retractable such that when not activated, deflated gaskets 120 are recessed under surface 118. When activated, gaskets 120 inflate and extend above surface 118 to contact surface 113 of rotary gate valve 104, providing a seal, as described above.

FIGS. 6A–6D illustrate an alternative embodiment of a rotary gate valve. Rotary gate valve 114 operates in a manner substantially similar to that described above with respect to rotary gate 104 (FIGS. 5A–5D). Rotary gate 114 is an elongated cylinder mounted along valve main body 100 and includes a slot 115 aligned along an axis 103 with aperture 102 and aperture 138. Rotary gate 114, like rotary gate 104, is roughly circular in cross-section. However, rotary gate valve 114 differs from rotary gate valve 104 in that slot 115 is formed in the elongated cylinder such that only three sides of slot 115 are bounded by the elongated cylinder. As seen in FIGS. 6A–6D, a cross-section of rotary gate 114 along the length of the slot appears to be less than a half-moon.

Figure 6A:
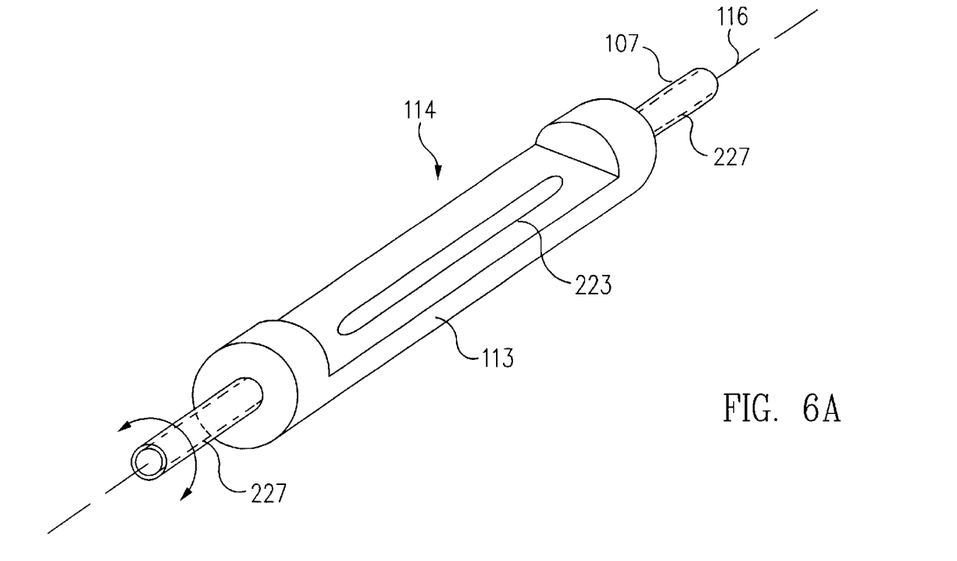
FIGS. 6A–6E illustrate another embodiment of a rotary gate valve in open and closed positions.
Figure 6B:
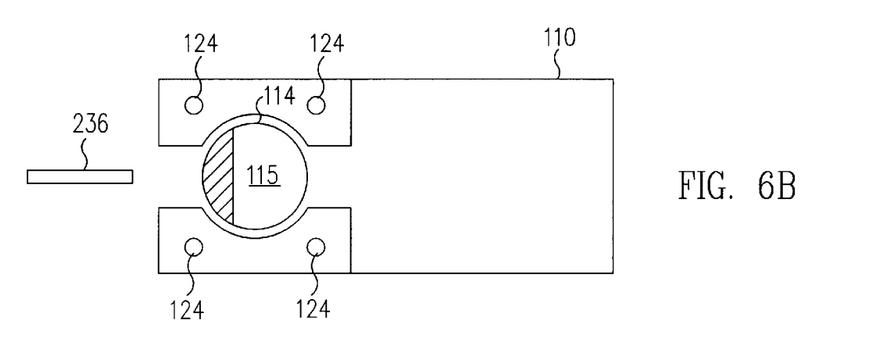
Figure 6C:
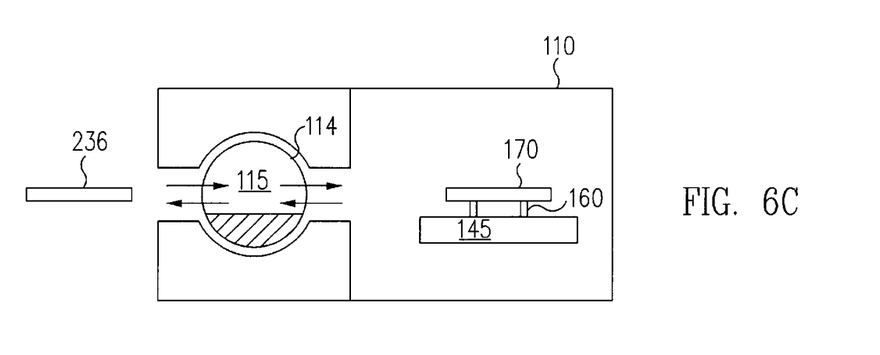
Figure 6D:
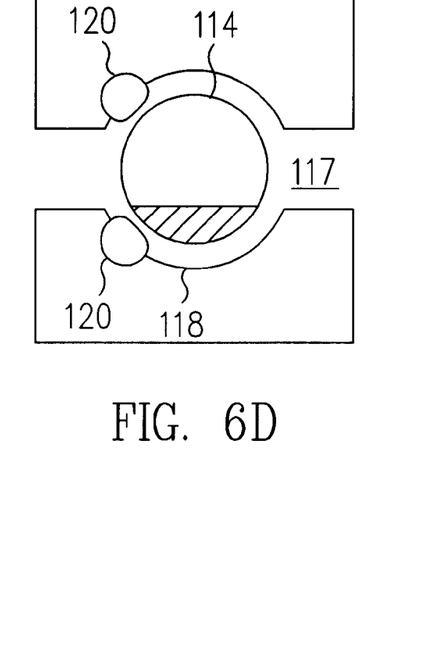
Figure 6E:
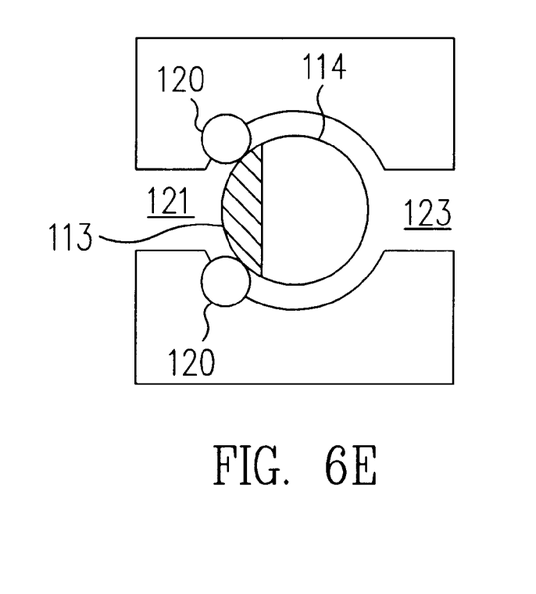

As seen in FIGS. 6A & 6B, gate 114 may further include an exhaust port 223, which allows for controlling pressure within the process chamber. Exhaust port 223 may be connected to an access passage 227 drilled or otherwise formed on one end of drive shaft 107 such that gas may be exhausted through passage 227 from the process chamber. In the alternative, passage 227 may be used to pass coolant through gate 114 in order to cool gate 114. Also, cooling fluid ports 124 are provided (FIG. 6B), which allow a coolant to flow so as to reduce the external temperature of the gate valve main body during RTP.

Figure 7:
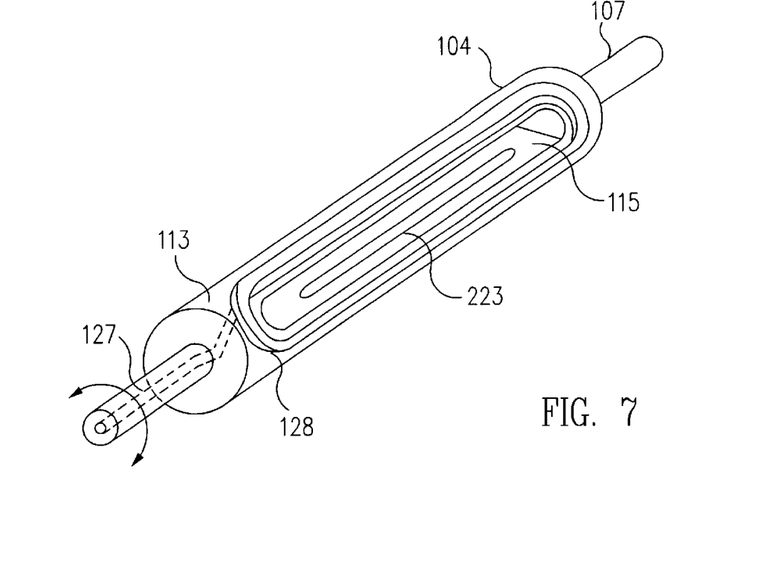
FIG. 7 illustrates an embodiment of a rotary gate valve with inflatable gasket.

FIG. 7 illustrates an alternative embodiment of rotary gate valve 104. A gasket tube 128 is placed in a groove formed around the periphery of each opening of slot 115 in gate 104. Gasket 128 may be formed of the same materials as the gaskets described above. When rotary gate valve 104 is in a closed position, gasket 128 is inflatable to form a seal between slot 115 and the openings to the process chamber 110 and transfer chamber 20. An access passage 127 can be drilled or otherwise formed on one end of drive shaft 107. Passage 127 is operationally connected to inflatable gasket 128 such that gasket 128 is pressurized and inflates when air or any other suitable gas is passed into passage 127 as gate valve 104 is in a closed position. In the alternative, access passage 127 may be used to pass coolant through gate 104 in order to cool gate 104. In the alternative, gate 104 may further include an exhaust port 223, which allows for controlling pressure within the process chamber. Exhaust port 223 may be connected to access passage 127 drilled or otherwise formed on one end of drive shaft 107 such that gas may be exhausted through passage 127 from the process chamber.

Figure 8:
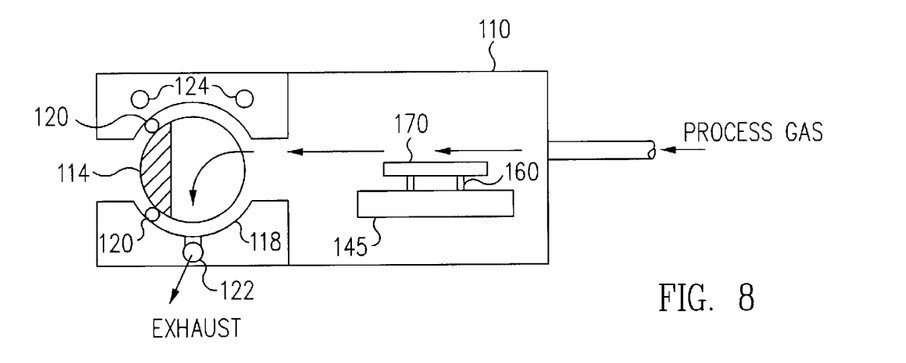
FIG. 8 illustrates an embodiment of a gate valve main body.

As seen in FIG. 8, the gate valve assembly may further include an exhaust port 122, which allows for controlling pressure within the process chamber pressure. Also, cooling fluid ports 124 are provided, which allow a coolant to flow so as to reduce the external temperature of the gate valve main body during RTP.

Figure 9:
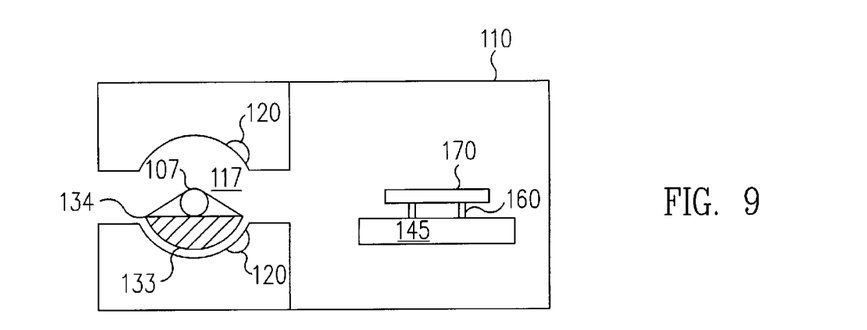
FIG. 9 illustrates an embodiment of a rotary gate valve.

FIG. 9 illustrates an alternative embodiment of a rotary gate valve 134 which operates in a manner substantially similar to that described above with respect to rotary gate 104 (FIGS. 5A–5D). Rotary gate 134 includes a draft shaft 107 connected at each end of an elongated hemispherical portion. The hemispherical portion fits generally within a hemispherical portion of port 117 such that when gate valve 134 is in an open position, a robot 22 carrying wafer 170 is able to pass unobstructed through ends 121, 123 into chamber 110. Outer surface 133 of gate 134 may have a highly polished surface or may be coated with a heat/radiation reflective coating in a manner as described above. When gate 134 is in a closed position, surface 133 is exposed to process chamber 110 and inflatable gaskets 120 located at end 123 may be used so as to seal process chamber 110 from transfer chamber 20.

FIGS. 10A–10E illustrate an alternative embodiment of gate valve assembly 218 of FIG. 3. Housed within gate valve main body 300 and aligned along the valve central axis 301 are stacked sliding gate 304, bellows 306, plumbing interface 308, linear drive shaft 310, and actuator 326, all assembled together to provide gate valve assembly 218. In one example, valve main body 300 defines a port 317. Port 317 has a first end 321, which provides initial access to the reactor through gate valve 218, and a second end 323, which has an aperture or opening 302 configured to mate with aperture 238 of quartz tube 230. The geometry and dimensions of valve aperture 302 generally correspond to those of reactor aperture 238, so that valve aperture 302 and reactor aperture 238 can be used together to provide a seal, which maintains a selected vacuum or pressurized environment within tube 230 or isolates cavity 232 during wafer processing operations.

Gate 304 is an elongated plate mounted at an upper end of drive shaft 310. The elongated plate is well suited for sealing slot-type openings, such as valve aperture 302. The geometry of gate 304 may be changed to accommodate differently shaped openings. As shown in FIGS. 10A–10E, gate 304 maybe made of quartz, ceramics or any metallic material such as aluminum, stainless steel or $Al_2O_3$. Gate valve 304 may be machined or formed by extrusion. Each gate 304 includes a plurality of slots 315 aligned along an axis 303 with aperture 302 and aperture 338 when gate 304 is in an open position. The number of slots 315 is generally equal to the number of ports 317. Slots 315 may be machined into gate 304; sized and shaped so as to allow robot 22 to pass a wafer 170 from transfer chamber 20 through port 317 to tube 230 where wafer 170 is placed upon wafer support standoffs 160. Each slot 115 is roughly oblong-shaped and cut through gate 304 from a first side 313 to a second side 316. Slot 315 may be rectangular or any shape suitable for a wafer 170 to be passed through it by robot 22. The length L (FIG. 10C) of slot 315 is less than that of the width W of gate 304. The geometry of gate 304 may be changed to accommodate differently shaped openings. In one embodiment, the surface of side 313 may have a highly polished surface or may be coated with a heat/radiation reflective coating, such as gold, silver, Ni, Molybdenum, or other metal with a high melting point relative to the process temperatures. The reflective surface may reflect radiation energy, which may leak through valve aperture 302, back into tube 230 (FIGS. 10A–10E).

Figure 10A:
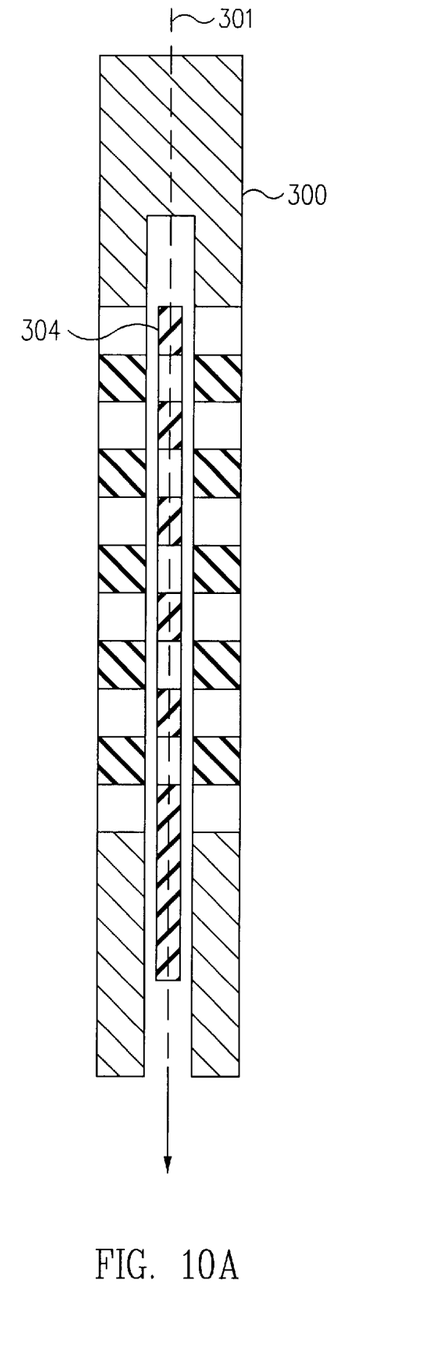
FIGS. 10A–10E illustrate an alternative embodiment of a gate valve assembly.
Figure 10B:
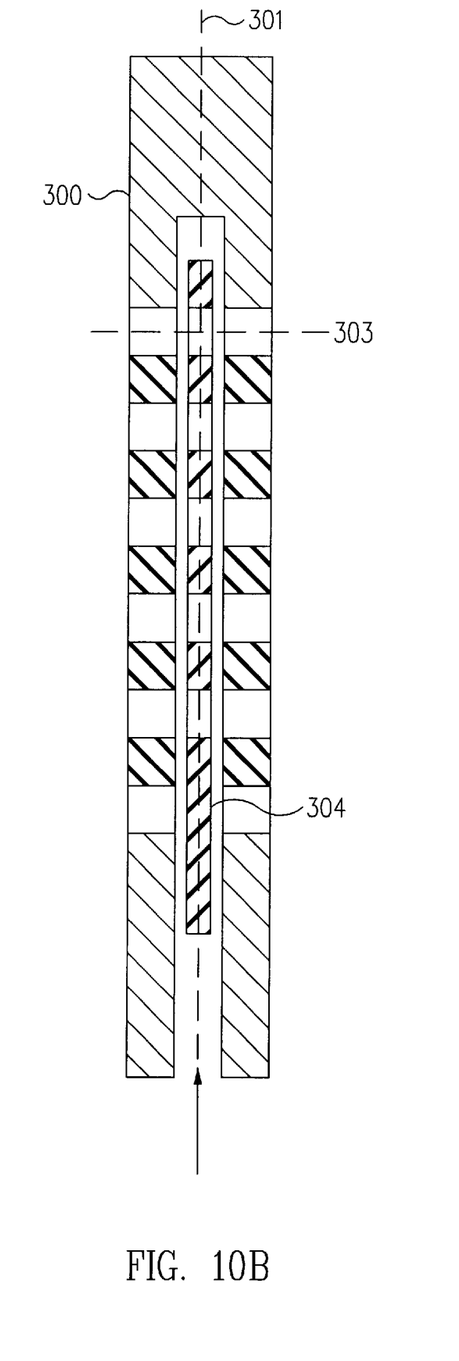
Figure 10C:
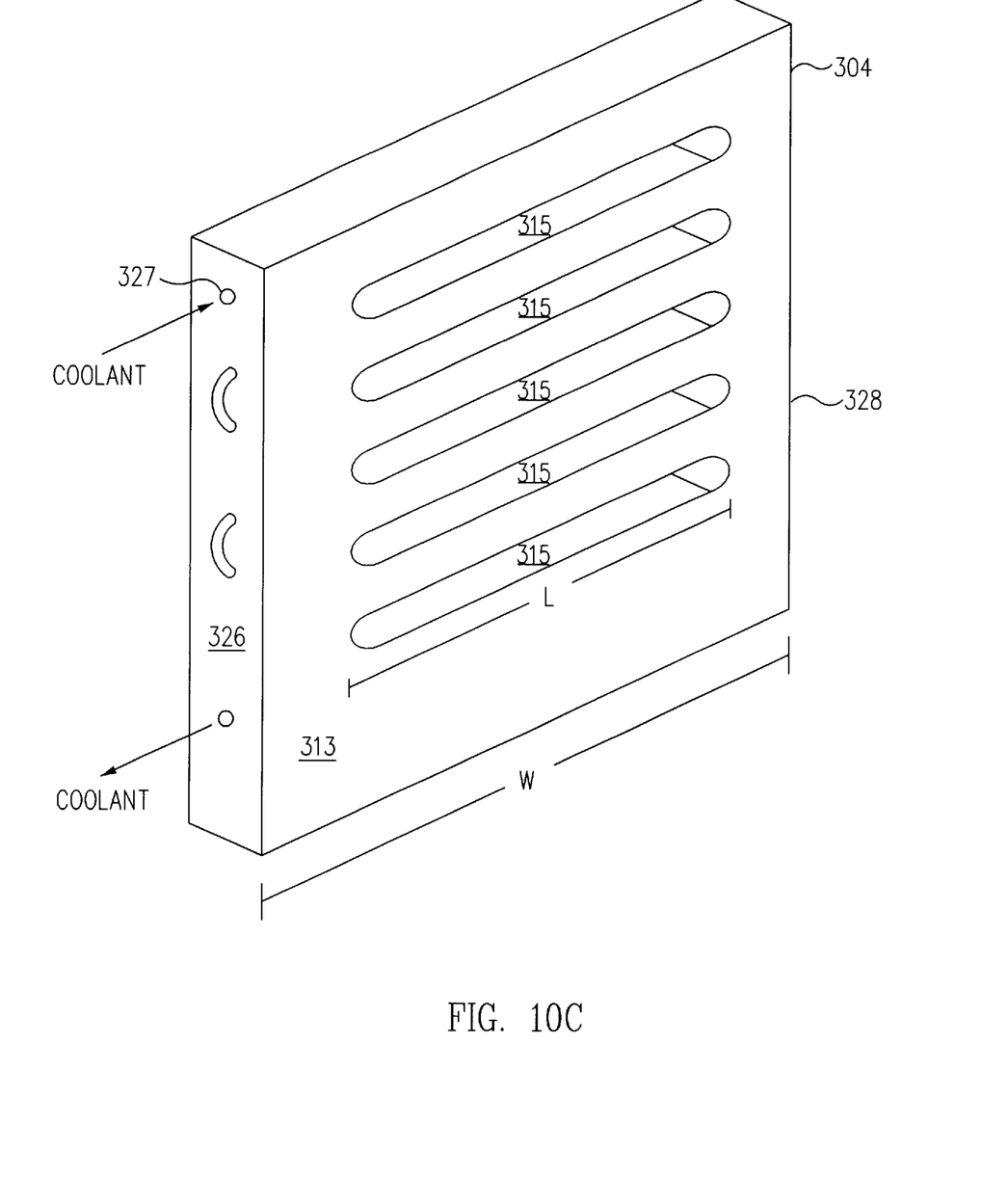
Figure 10D:
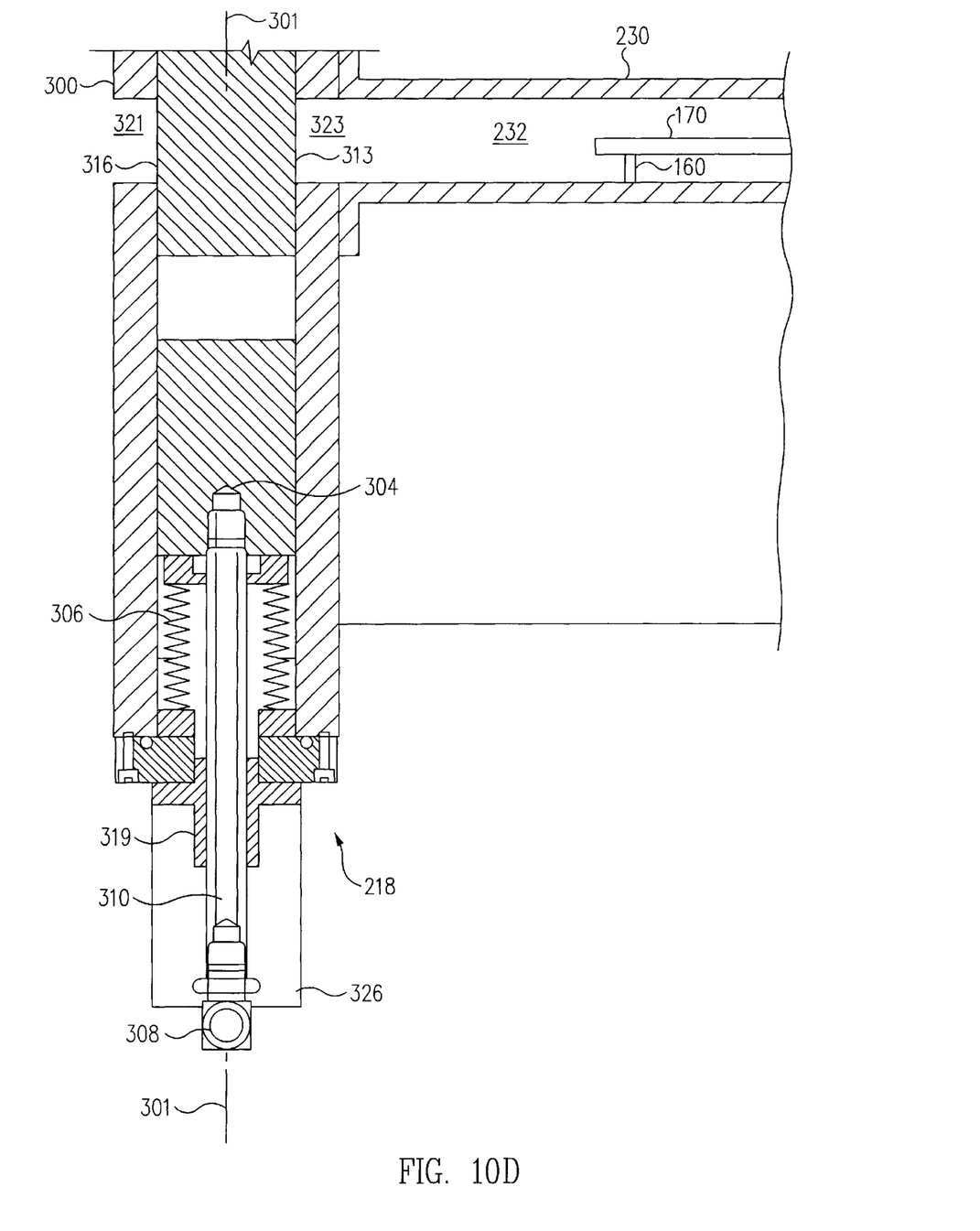
Figure 10E:
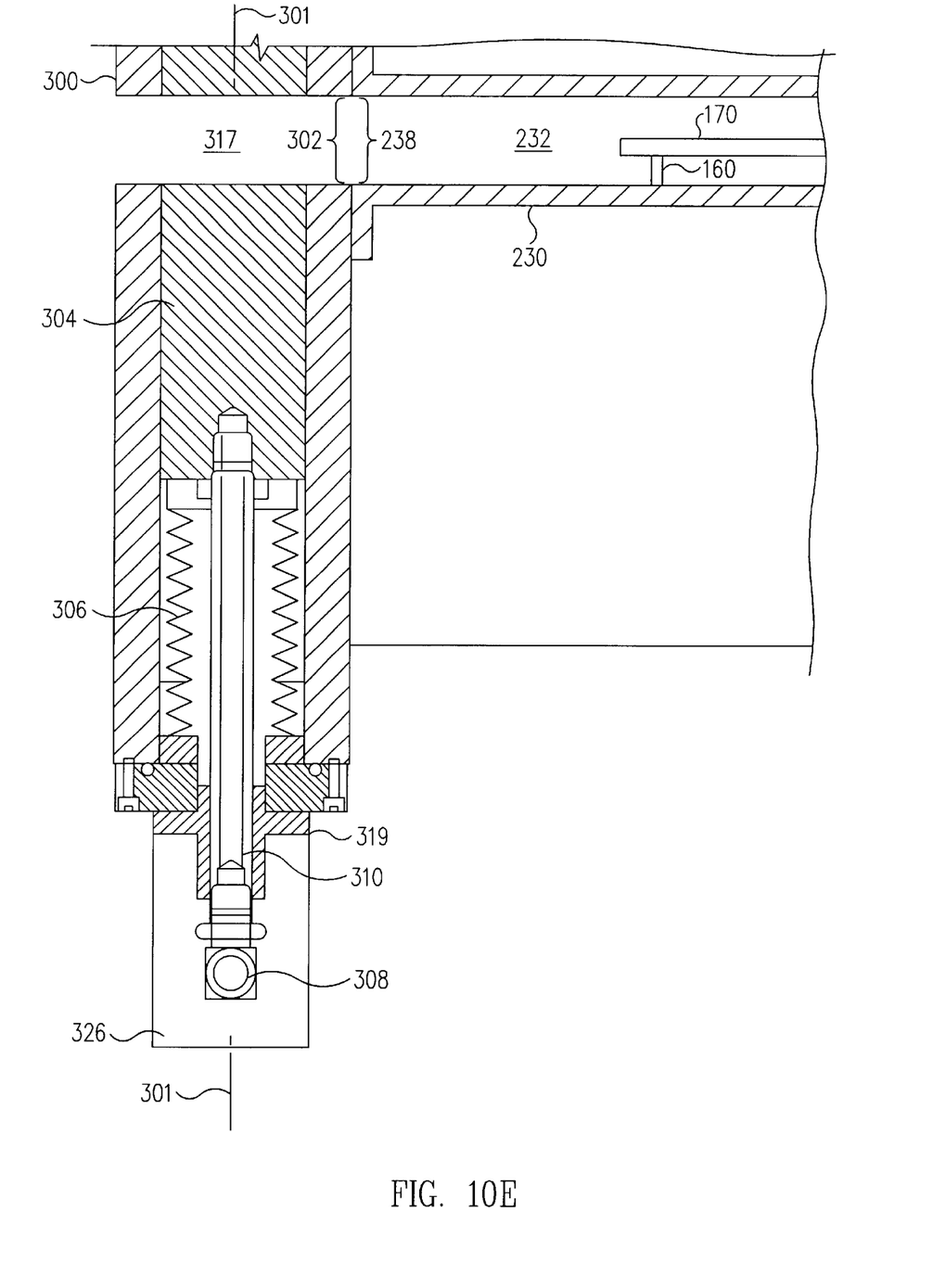

By way of example, when drive shaft 310 is moved up into main body 300, gate 304 is moved upward into an open position (FIGS. 10B and 10E). Drive shaft 310 is moved up and/or down through linear guide 319 by a linear action created using actuator 326. In one embodiment, to move drive shaft 310, actuator 326 is supplied at plumbing interface 308 with a conventional incompressible fluid, such as water or alcohol. The supply of fluid causes drive shaft 310 to move linearly through linear guide 319 into main body 300.

By moving linear shaft 310 vertically upward, as described in FIGS. 10B and 10E, linear shaft 310 drives the expansion of bellows 306. Bellows 306 surrounds shaft 310 along axis 301. In this embodiment, bellows 306 establishes a vacuum seal between actuator 326 and main body 300 to ensure that tube 230 is not contaminated from the outside environment during opening and closing of the valve.

As shown in FIG. 10B, when linear shaft 310 reaches the end of its effective travel length, each port 315 is in an open position, allowing wafers 170 to be moved into and/or out of tube 230. To close valve 304 from the open configuration, gate 304 is lowered along bore 317 when drive shaft 310 is moved down and out from main body 300 through linear guide 319 (FIGS. 10A and 10D) by actuator 326, thus closing gate 304 for processing of wafer 170 in tube 230.

In the alternative, access passage 327 may be used to pass coolant through gate 304 in order to cool gate 304. A plurality of passages 327 run through gate 304 generally parallel to slots 315, with passages 327 located above and below each slot 315. As coolant passes through passage 327, heat is absorbed from gate 304. A plurality of cooling fluid tubes 324 are located at opposite sides 326, 328 of gate 304. Each cooling fluid tube 324 operationally connects two passages 327, in order to allow coolant to flow between the passages 327, where each passage 327 is located either above or below the passage to which it is connected through tube 324. Additionally in the alternative, gate valve 304 may also include an exhaust port (not shown) which allows for controlling pressure within the process chamber.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as falling within the true spirit and scope of this invention.

I claim:

1. A valve assembly for use with a semiconductor wafer processing reactor, the valve assembly comprising:

a main body defining a central axis;

a gate having an curved surface relative to said central axis, said gate disposed within said main body and rotatable about an axis of rotation running along the length of the gate; and an actuation assembly for rotating said gate about said axis of rotation between a first position where said gate is open and a second position where said gate is closed, said main body including an inflatable gasket configured to prevent leakage of gas.

2. The valve of claim 1, wherein said curved surface further comprises a coating of a radiation reflecting material.

3. The valve of claim 2, wherein said coating comprises a material selected from the group consisting of gold, silver, aluminum, Ni, and Molybdenum.

4. The valve of claim 1, wherein said gate is generally cylindrical in shape.

5. The valve of claim 1, wherein said curved surface comprises a slot through which an object may be passed from a first side of said main body to a second side of the main body when said gate is in said first position.

6. A valve assembly for use with a semiconductor wafer processing reactor, the valve assembly comprising:

a main body defining a central axis;

a gate having an curved surface relative to said central axis, said gate disposed within said main body and rotatable about an axis of rotation running along the length of the gate; and an actuation assembly for rotating said gate about said axis of rotation between a first position where said gate is open and a second position where said gate is closed wherein said curved surface further includes a coating of a radiation reflecting material, and wherein said curved surface further includes an SiN coating for U.V. protection.

7. A valve assembly for use with a semiconductor wafer processing reactor, the valve assembly comprising:

a main body defining a central axis;

a gate having an curved surface relative to said central axis, said gate disposed within said main body and rotatable about an axis of rotation running along the length of the gate; and an actuation assembly for rotating said gate about said axis of rotation between a first position where said gate is open and a second position where said gate is closed wherein said curved surface further includes a coating of a radiation reflecting material, and wherein said main body further includes a seal capable of preventing leakage of gas, and wherein said seal includes an inflatable gasket.

8. A valve assembly for use with a semiconductor wafer processing reactor, the valve assembly comprising:

a main body defining a central axis;

a gate having an curved surface relative to said central axis, said gate disposed within said main body and rotatable about an axis of rotation running along the length of the gate; and an actuation assembly for rotating said gate about said axis of rotation between a first position where said gate is open and a second position where said gate is closed, wherein said curved surface further includes a coating of a radiation reflecting material, and wherein said gate further includes a seal capable of preventing leakage of gas, and wherein said seal includes an inflatable gasket.

9. A valve for use with a reactor, the valve comprising:

a main body having a port therethrough;

a seal disposed within said main body capable of sealing said port; and an actuation means for rotating said seal relative to said main body between a first position where said reactor is sealed and a second position where said reactor is unsealed.

10. The valve of claim 9, wherein said seal further comprises a gate having a curved surface.

11. The valve of claim 10, wherein said gate is generally cylindrical in shape.

12. The valve of claim 10, wherein said curved surface further comprises a coating of a radiation reflecting material.

13. The valve of claim 12, wherein said coating comprises a material selected from the group consisting of gold, silver, aluminum, Ni, and Molybdenum.

14. The valve of claim 10, wherein said curved surface further comprises an SiN coating for U.V. protection.

15. The valve of claim 10, wherein said gate is generally cylindrical in shape.

16. The valve of claim 9, wherein said seal further comprises an inflatable gasket for preventing the leakage of gas.

17. The valve of claim 10, wherein said gate further comprises an inflatable gasket for preventing the leakage of gas.

18. The valve of claim 10, wherein said curved surface comprises a slot through which an object may be passed from a first side of said main body to a second side of the main body when said gate is in said second position.

* * * * *